(12) United States Patent
Burr

(10) Patent No.: US 10,896,370 B2
(45) Date of Patent: Jan. 19, 2021

(54) TRIAGE OF TRAINING DATA FOR ACCELERATION OF LARGE-SCALE MACHINE LEARNING

(71) Applicant: INTERNATIONAL BUSINESS MACHINES CORPORATION, Armonk, NY (US)

(72) Inventor: Geoffrey W. Burr, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 896 days.

(21) Appl. No.: 15/449,458

(22) Filed: Mar. 3, 2017

(65) Prior Publication Data
US 2018/0253645 A1 Sep. 6, 2018

(51) Int. Cl.
| | | |
|---|---|---|
| *G01N 33/48* | (2006.01) | |
| *G06F 3/01* | (2006.01) | |
| *A61B 5/00* | (2006.01) | |
| *G06N 99/00* | (2019.01) | |
| *G06N 5/02* | (2006.01) | |
| *G06N 3/08* | (2006.01) | |

(52) U.S. Cl.
CPC ............... *G06N 3/08* (2013.01); *G06N 3/084* (2013.01)

(58) Field of Classification Search
CPC .......... G06N 3/08; G06N 3/084; G06N 3/049; G06N 3/063
USPC ...................................................... 706/1–62
See application file for complete search history.

(56) References Cited

U.S. PATENT DOCUMENTS

| | | | | |
|---|---|---|---|---|
| 5,052,043 A | * | 9/1991 | Gaborski ............... | G06N 3/084 382/157 |
| 6,075,891 A | * | 6/2000 | Burman .................... | G06T 7/44 382/191 |
| 2002/0010691 A1 | * | 1/2002 | Chen .................... | G06K 9/6278 706/20 |
| 2011/0119209 A1 | * | 5/2011 | Kirshenbaum .......... | G06N 5/02 706/12 |

(Continued)

OTHER PUBLICATIONS

Huang, S. C., & Huang, Y. F. (1990). Learning algorithms for perceptrons using back-propagation with selective updates. IEEE Control Systems Magazine, 10(3), 56-61. (Year: 1990).*

(Continued)

*Primary Examiner* — Brandon S Cole
(74) *Attorney, Agent, or Firm* — Erik A. Huestis; Stephen J. Kenny; Foley Hoag, LLP

(57) ABSTRACT

Triage of training data for acceleration of large-scale machine learning is provided. In various embodiments, training input from a set of training data is provided to an artificial neural network. The artificial neural network comprises a plurality of output neurons. Each output neuron corresponds to a class. From the artificial neural network, output values are determined at each of the plurality of output neurons. From the output values, a classification of the training input by the artificial neural network is determined. A confidence value of the classification is determined. Based on the confidence value, a probability of inclusion of the training input in subsequent training is determined. A subset of the set of training data is determined based on the probability. The artificial neural network is trained based on the subset.

19 Claims, 9 Drawing Sheets

(56) References Cited

U.S. PATENT DOCUMENTS

| | | | | |
|---|---|---|---|---|
| 2013/0023282 | A1* | 1/2013 | Lin | G01S 5/021 |
| | | | | 455/456.1 |
| 2015/0019460 | A1* | 1/2015 | Simard | H04L 1/0079 |
| | | | | 706/11 |
| 2015/0033341 | A1* | 1/2015 | Schmidtler | H04L 63/14 |
| | | | | 726/23 |
| 2016/0174902 | A1* | 6/2016 | Georgescu | A61B 5/7267 |
| | | | | 600/408 |

OTHER PUBLICATIONS

Li, W., Han, J. & Pei, J. (Nov. 2001). CMAR: Accurate and efficient classification based on multiple class-association rules. In Proceedings 2001 IEEE international conference on data mining (pp. 369-376). IEEE. (Year: 2001).*

Borovicka, T., Jirina Jr, M., Kordik, P., & Jirina, M. (2012). Selecting representative data sets. Advances in data mining knowledge discovery and applications, 19. (Year: 2012).*

Ghorbani, S., & Desmarais, M. C. (Jul. 16, 2014). An Adaptive Sampling Algorithm to Improve the Performance of Classification Models. (Year: 2014).*

Wu, Y., Li, J., Kong, Y., & Fu, Y. (Oct. 2016). Deep convolutional neural network with independent softmax for large scale face recognition. In Proceedings of the 24th ACM international conference on Multimedia (pp. 1063-1067). ACM. (Year: 2016).*

Frinken, V., & Bunke, H. (Jul. 2009). Evaluating retraining rules for semi-supervised learning in neural network based cursive word recognition. In 2009 10th International Conference on Document Analysis and Recognition (pp. 31-35). IEEE. (Year: 2009).*

J.Nalepa and M.Kawulok, "A Memetic Algorithm to Select Training Data for Support Vector Machines," (2014), http://dx.doi.org/10.1145/2576768.2598370.

Ninon Sajeeth Philip, "Optimal Selection of Training Data for the Difference Boosting Neural Networks," An Introductio to DBNN.

Vijayakumar et al., "Training Data Selection for Optimal Generalization with Noise Variance Reduction in Neural Networks," Marinaro & Tagliaferri(ed.), Neural Nets WIRN Vietri-98, pp. 153-166, Springer-Verlag(1998).

Chaofan Sun, "Closest Pairs Data Selection for Support Vector Machines," (2006) American Association for Artificial Intelligence.

* cited by examiner

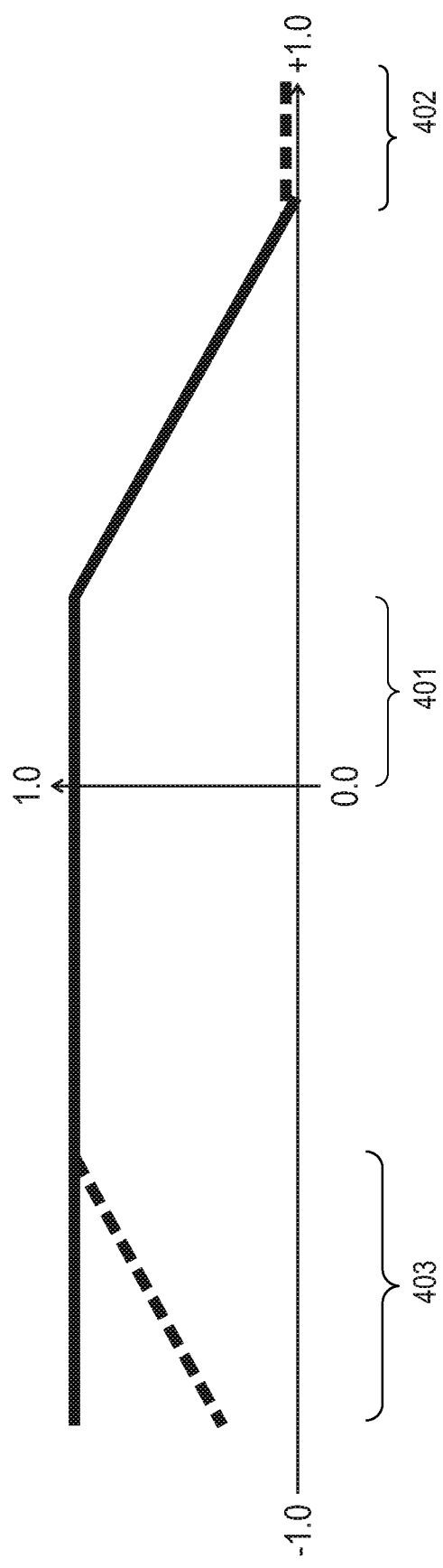

TRIAGE OF TRAINING DATA FOR ACCELERATION OF LARGE-SCALE MACHINE LEARNING

BACKGROUND

Embodiments of the present invention relate to training of neural networks, and more specifically, to triage of training data for acceleration of large-scale machine learning.

BRIEF SUMMARY

According to embodiments of the present disclosure, methods of and computer program products for training neural networks are provided. Training input from a set of training data is provided to an artificial neural network. The artificial neural network comprises a plurality of output neurons. Each output neuron corresponds to a class. From the artificial neural network, output values are determined at each of the plurality of output neurons. From the output values, a classification of the training input by the artificial neural network is determined. A confidence value of the classification is determined. Based on the confidence value, a probability of inclusion of the training input in subsequent training is determined. A subset of the set of training data is determined based on the probability. The artificial neural network is trained based on the subset.

According to embodiments of the present disclosure, methods of and computer program products for enhancing the performance of an artificial neural network are provided. The artificial neural network comprises a plurality of neurons, and is adapted to process a plurality of inputs to provide an output. The plurality of neurons is arranged in layers. Outputs of one layer are connected to inputs of each neuron of a subsequent layer by synapses. Each synapse has a variable strength. A plurality of training examples is serially inputted to the artificial neural network. The desired output neuron is known for each of the plurality of training examples. The output of the artificial neural network is determined. A confidence value is computed for each training example. The confidence value indicates the performance of the desired output neuron relative to other output neurons. A probability is computed from each of the confidence values. The probability indicates the probability of inclusion in subsequent training. A subset of training examples is selected for subsequent training based on the probabilities. The synaptic strengths are updated by backpropagation based on a difference between network output and desired output for the subset of training examples. The confidence values are recomputed, the subset reselected, and the synaptic strengths reupdated until the network achieves a target accuracy.

BRIEF DESCRIPTION OF THE SEVERAL VIEWS OF THE DRAWINGS

FIG. 4 illustrates a probabilistic method of selecting a subset of training examples according to embodiments of the present disclosure.

DETAILED DESCRIPTION

Figure 1:
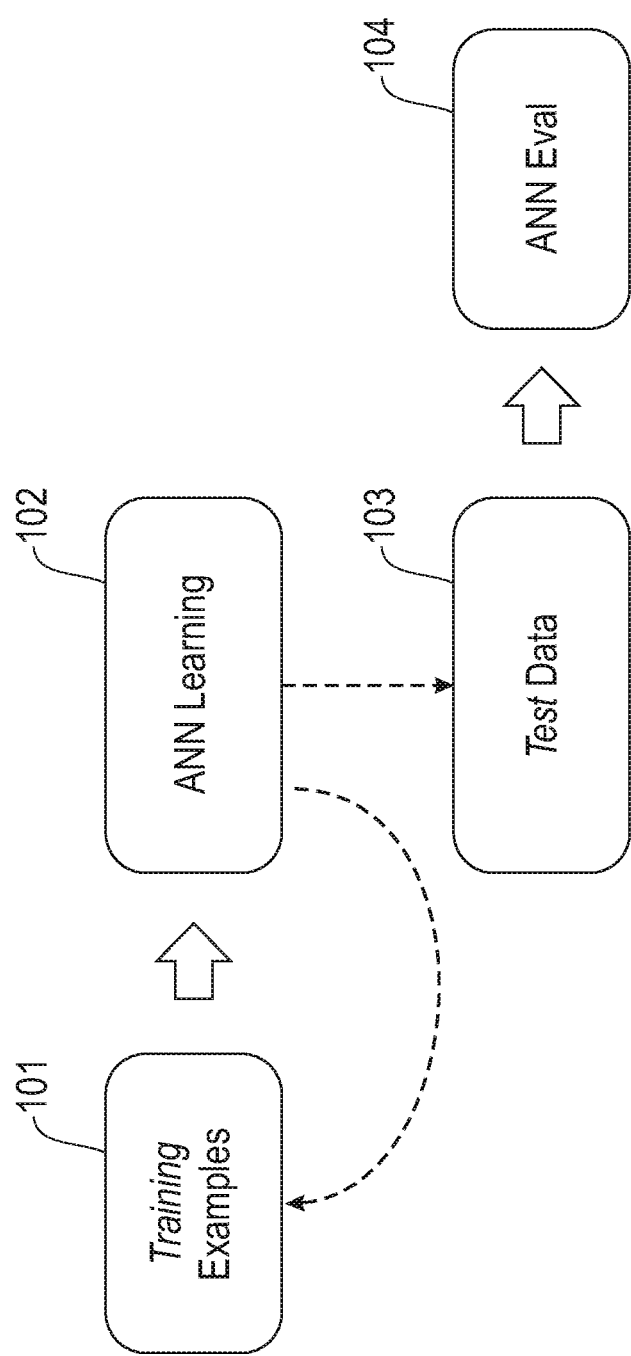
FIG. 1 illustrates a method of training an artificial neutral network.

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons from preceding layers and the strength of the connections as determined by the synaptic weights. An ANN is trained to solve a specific problem (e.g., pattern recognition) by adjusting the weights of the synapses such that a particular class of inputs produce a desired output.

Various algorithms may be used for this learning process. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An n error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

When applying backpropagation, an ANN rapidly attains a high accuracy on most of the examples in a training-set. The vast majority of training time is spent trying to further increase this test accuracy. During this time, a large number of the training data examples lead to little correction, since the system has already learned to recognize those examples. While in general, ANN performance tends to improve with the size of the data set, this can be explained by the fact that larger data-sets contain more borderline examples between the different classes on which the ANN is being trained.

To remedy the inefficiency of backpropagation, there is a need in the art to efficiently identify the small portion of training data that will be the most effective in training an ANN to generalize and thus minimize classification errors in a test set. Accordingly, the present disclosure provides systems and methods for improving performance of ANN training by identifying data in the training set that are most effective in training. Thus, data on which an ANN has already adequately trained can be skipped, allowing a faster overall training process.

By analogy to the prioritization of a patient's medical treatment, the prioritization of data for training is referred to herein as triage.

With reference now to FIG. 1, a method of training an artificial neural network is illustrated. A plurality of training examples 101 is provided for ANN learning 102. In this example, the set of training examples has cardinality m. Learning comprises forward evaluation of the training examples, followed by backpropagation and update of synaptic weights. The process is repeated over multiple epochs as the ANN converges. After training, test data 103 are provided for ANN evaluation 104. At this phase, only forward evaluation is performed. The results from evaluation 104 may be compared to known correct results, if any, to test the accuracy of the trained network.

Figure 2:
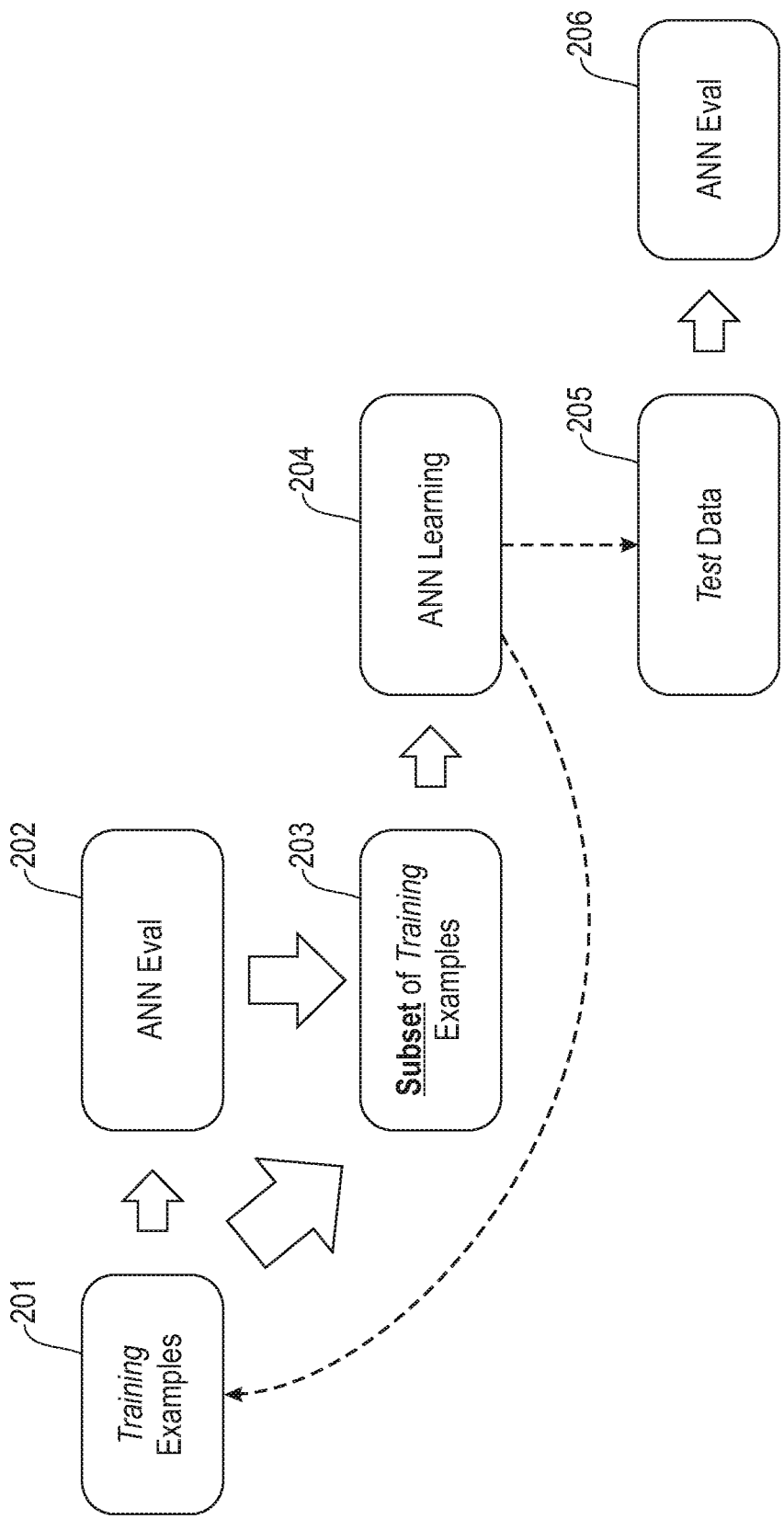
FIG. 2 illustrates a method of training an artificial neutral network according to embodiments of the present disclosure.

With reference now to FIG. 2, a method of training an artificial neural network is illustrated according to embodiments of the present disclosure. A plurality of training examples 201 is provided for ANN evaluation 202. In this example, the set of training examples has cardinality m. At this phase, only forward evaluation is performed. In some embodiments, evaluation at this phase is pipelined. It will be appreciated that because backpropagation is not performed at this phase, the entire training set may be processed faster than described above with regard to learning 102. Based on the results of evaluation 202, a subset 203 of training examples 201 is selected. The subset has cardinality $m_f \ll m$. The subset contains training examples that the ANN does not perform well on in evaluation 202. In some embodiments, the subset also includes a plurality of randomly selected examples from training examples 201. Inclusion of a few randomly selected additional examples helps maintain high classification accuracy for the many similar examples on which the ANN has already been sufficiently trained.

The subset 203 is provided for ANN learning 204. Learning comprises forward evaluation of the subset of training examples, followed by backpropagation and update of synaptic weights. The process of providing training example 201 for evaluation 202 and selecting a subset 203 for learning 204 is repeated over multiple epochs as the ANN converges. By selecting a subset of training examples at each iteration, the total computation time required to train the ANN is reduced.

In some embodiments, instead of performing evaluation 202 on the entire set of training examples 201, evaluation is only performed on examples likely to be in subset 203. In some embodiments, the subset determined in the prior epoch is used. In some embodiments, evaluation 202 is performed on the entire set of training examples 201 periodically, while the majority of iterations of evaluation 202 are performed on examples likely to be in subset 203.

After training, test data 205 are provided for ANN evaluation 206. At this phase, only forward evaluation is performed. The results from evaluation 206 may be compared to known correct results, if any, to test the accuracy of the trained network.

Figure 3:
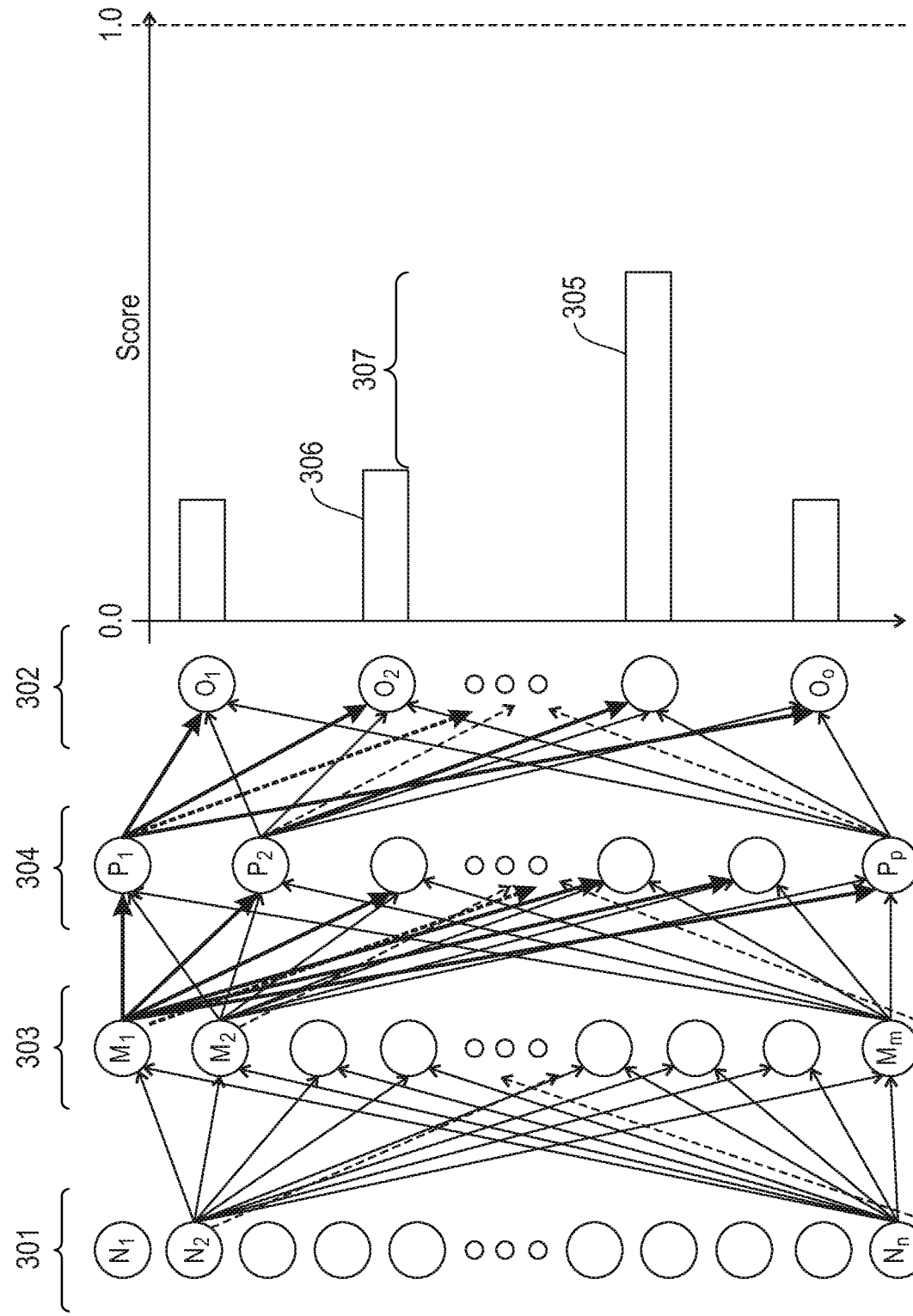
FIG. 3 illustrates a method of selecting a subset of training examples according to embodiments of the present disclosure.

Referring to FIG. 3, a method of selecting a subset of training examples is illustrated according to embodiments of the present disclosure. A neural network comprises an input layer 301 of neurons, an output layer 302 of neurons, and one or more hidden layers 303 . . . 304 of neurons. Output layer 302 produces a value per output. In this example, the value ranges from 0-1, and the highest value is considered the overall result of the ANN.

During evaluation 202, the score of the correct output of the neural network is compared to the highest scoring output excluding that neuron. In this example, the correct result is assumed to have score 305, while the highest scoring output of all other output neurons has score 306. The difference 307 between these scores is taken to be indicative of the network's confidence in that output. A positive value indicates that the correct answer had the highest score, while a negative value indicates that the correct answer did not have the highest score.

In various embodiments, the subset is selected by identifying those of the training examples that have a negative confidence value or that have a positive value below a predetermined threshold. In this way, the subset of training examples will contain those examples for which a wrong answer was generated and those for which a correct answer was generated with low confidence. In this way, the most useful examples are identified, where the ANN is misclassifying an example or is narrowly classifying it correctly. This may be conceptualized as a focus on the examples that lie near a boundary between classes.

Referring to FIG. 4, a probabilistic method of selecting a subset of training examples is illustrated according to embodiments of the present disclosure. In some embodiments, once a confidence value has been determined as described above with reference to FIG. 3, a probability is assigned to each training example. The subset is then determined based upon the probability of inclusion of each example. An exemplary probability distribution is illustrated in FIG. 4. The confidence value is given on the x-axis and the probability that a given example is included in the subset is given on the y-axis. In this example, the training examples that have a small positive confidence value (in interval 401) have a 1.0 probability of inclusion in the subset. Training examples with a negative confidence value also have a 1.0 probability of inclusion in the subset. As the confidence value increases above interval 401, the probability of inclusion in the subset decreases. In some embodiments, the probability goes to zero, while in some embodiments the probability decreases to a small non-zero probability (in interval 402) in order to allow a small number of accurately classified examples to be included. In some embodiments, training examples with a low confidence value may have a reduced probability to appear in the subset (in interval 403). In some embodiments, such as that depicted in FIG. 4, the probability of inclusion in the subset decreases monotonically as the confidence value increases above zero. In some embodiments, such as that depicted in FIG. 4, the probability of inclusion in the subset decreases monotonically as the confidence value decreases below zero.

The present disclosure accelerates training by reducing the number of training data-examples that need to be shown to the network for learning (e.g., training by forward-evaluation, back-propagation, and weight update). More training examples are presented to the neural network for forward evaluation than in a basic training method (such as that outlined with regard to FIG. 1). However, this may be done efficiently because forward evaluation is amenable to pipelining, since the values of the hidden units do not need to be saved for later weight update. Even without pipelining, forward evaluation is at least two times faster than full learning, since back-propagation is of roughly the same computational complexity as forward-evaluation.

Consider a set of m training examples (e.g., m=60,000). The network may be initially trained on some subset of m (e.g., 15,000 examples). The resulting weights may be used for forward-evaluation of all m examples, at which point the confidence value is determined as set out above. When the confidence value is positive, then a training example is classified correctly, while a negative value indicates a classification error. However, a large positive value indicates that a training example is well within the center of that classes' distribution, and thus spending time applying this example to the network over and over offers little in the way of return.

The confidence value may be used to compute a probability for each example to be included in a subset of size $m_f \ll m$. Confidence values that are small (whether positive or negative) may receive a high probability, decreasing to zero or close to zero at large positive values. The probabilities assigned to each training example may be compared to random numbers to pick the subset of training example for a subsequent training epoch. If the test accuracy is high (e.g., >80%), then the number of non-zero probabilities will be significantly smaller than m. These are the examples that may be considered as located at the boundaries between classes.

Additional training examples may be added randomly from across the entire set of m examples, to make sure that some examples representing the center and other parts of the distribution are still being shown to the network for training. In systems using data-parallelism, the probability of inclusion in the subset may be common across all nodes, while the selection of the subset is done on a per-node basis. In this way, while each node is likely to be given a similar subset, each node may be presented with slight variations.

The network may be trained on this subset, which requires many fewer computations than training on the entire set of training examples because $m_f \ll m$. After each training epoch, the forward evaluation may be repeated on the examples that had a non-zero probability of inclusion in the training subset. In this way, the focus probabilities quickly update on the borderline cases, between training epochs. At regular intervals (e.g., every 5 epochs initially, then every 10, then every 20), the forward evaluation is repeated on all m examples and the focus probabilities are determined anew. This addresses instances where the evolution of the network can cause examples that were previously decided with high confidence to be reduced significantly in confidence.

In some embodiments applied to a larger dataset with more classes, the confidence value may be adjusted so that it crosses through zero when the correct output neuron enters into the top range of some number of neurons (e.g., within the top 5 neurons). While there may be many examples retained for images that are not placed in the correct class, there may be a significant acceleration benefit from skipping over training images from classes that a partially-trained network has no problem recognizing.

Referring to FIG. 5, a graph of error is provided for an exemplary network trained on MNIST (the Mixed National Institute of Standards and Technology database of handwritten digits) according to embodiments of the present disclosure. This exemplary network is a 785-1000-1000-10 perceptron. The x-axis corresponds to time in seconds. The y-axis corresponds to error. Line 501 shows the test error of a network trained on 60,000 training examples according to the methods described with reference to FIG. 1 (without creating a training subset). Line 502 shows the training error for that training process. Line 503 shows the test error of a network trained according to the methods described with reference to FIG. 2 (creating a subset). Line 504 shows the training error for that training process.

The training process with triage (as reflected in lines 503, 504) initially trains on 16,600 examples, followed by 26,000, 30,000, 13,000, and 15,000. By the $10^{th}$ training epoch, $m_f$ decreases to 10,000. In this example, 2.5% of m (1,500 examples) is added to each training subset. Full assessment of all 60,000 examples was performed after the $1^{st}$, $3^{rd}$ and $5^{th}$ epoch, and then every five thereafter. Both examples use the same parameters for L2 regularization (0.001, to keep the network from exploding), momentum of 0.5, and dropout of 20% for the input layer and 50% elsewhere. The initial learning rate was identical for both networks, but because of the larger number of examples needing updates, a lower learning rate was used after the first epoch in the example with triage.

Figure 5A:
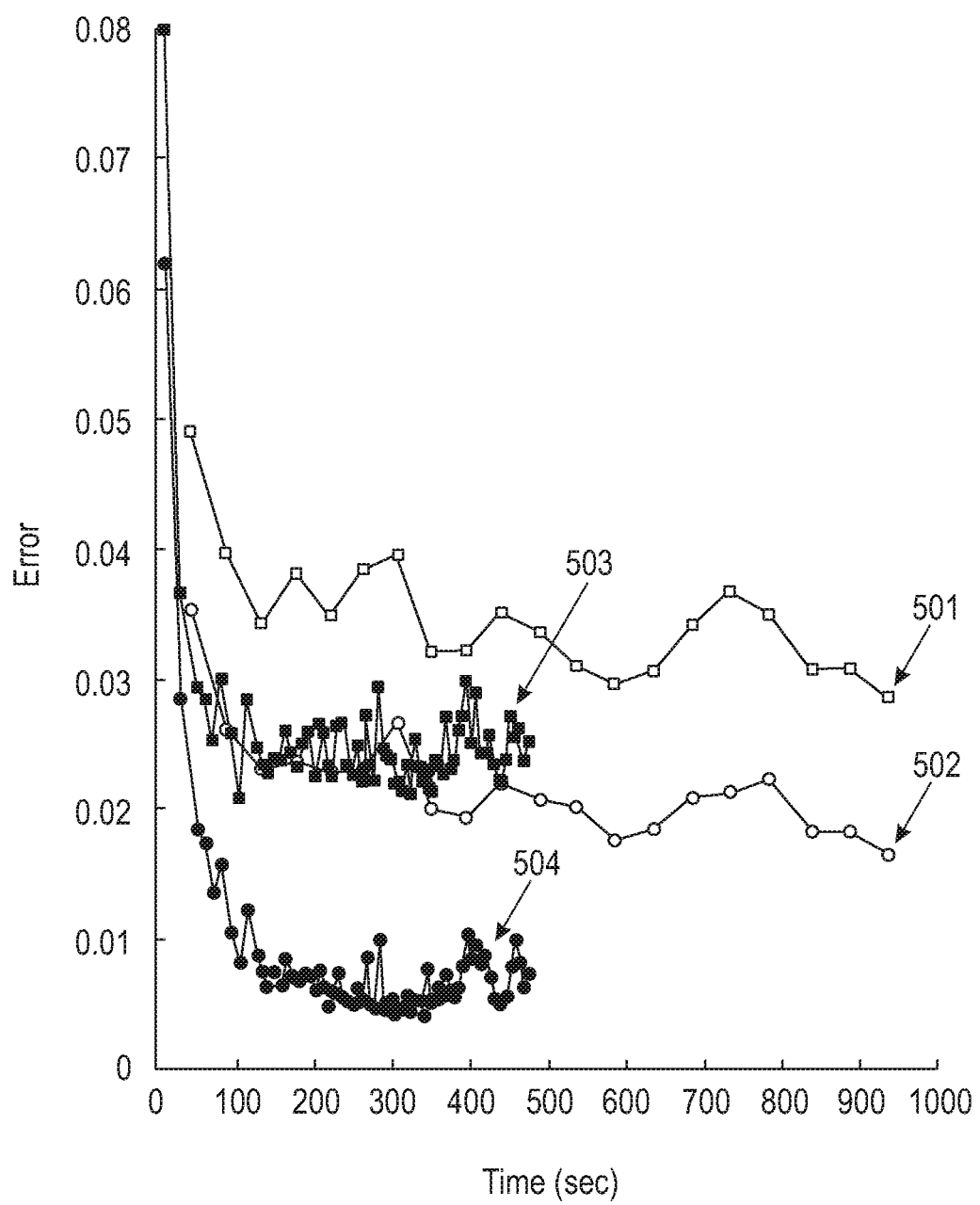
FIGS. 5A-B are graphs of error for an exemplary network trained on MNIST according to embodiments of the present disclosure.
Figure 5B:
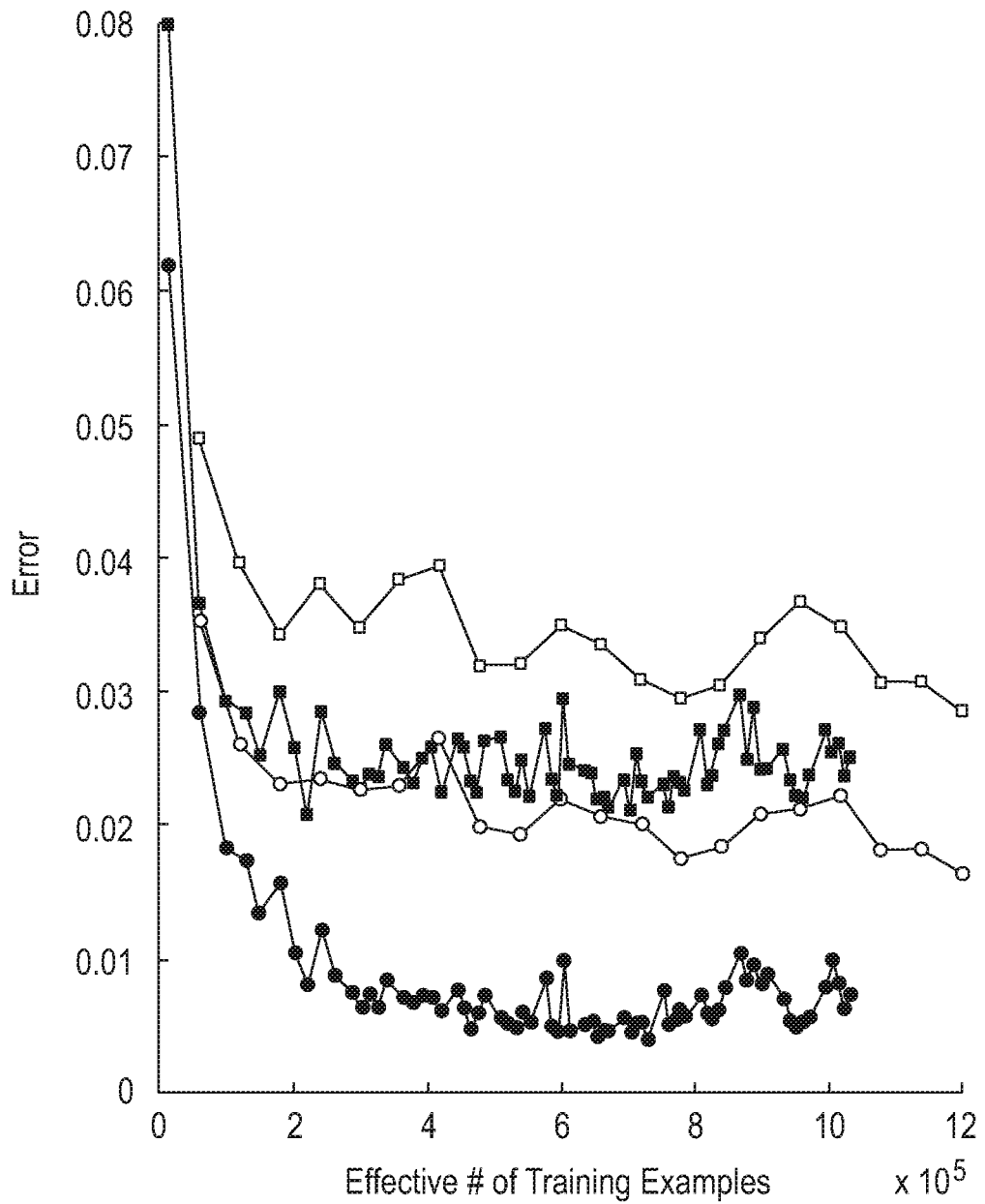

In FIG. 5A, the time does not include the test and training evaluation, so the time needed for building the focus probabilities is not reflected. In FIG. 5B, it is assumed that forward evaluation can be performed 3.5× faster per example than full training.

Figure 6:
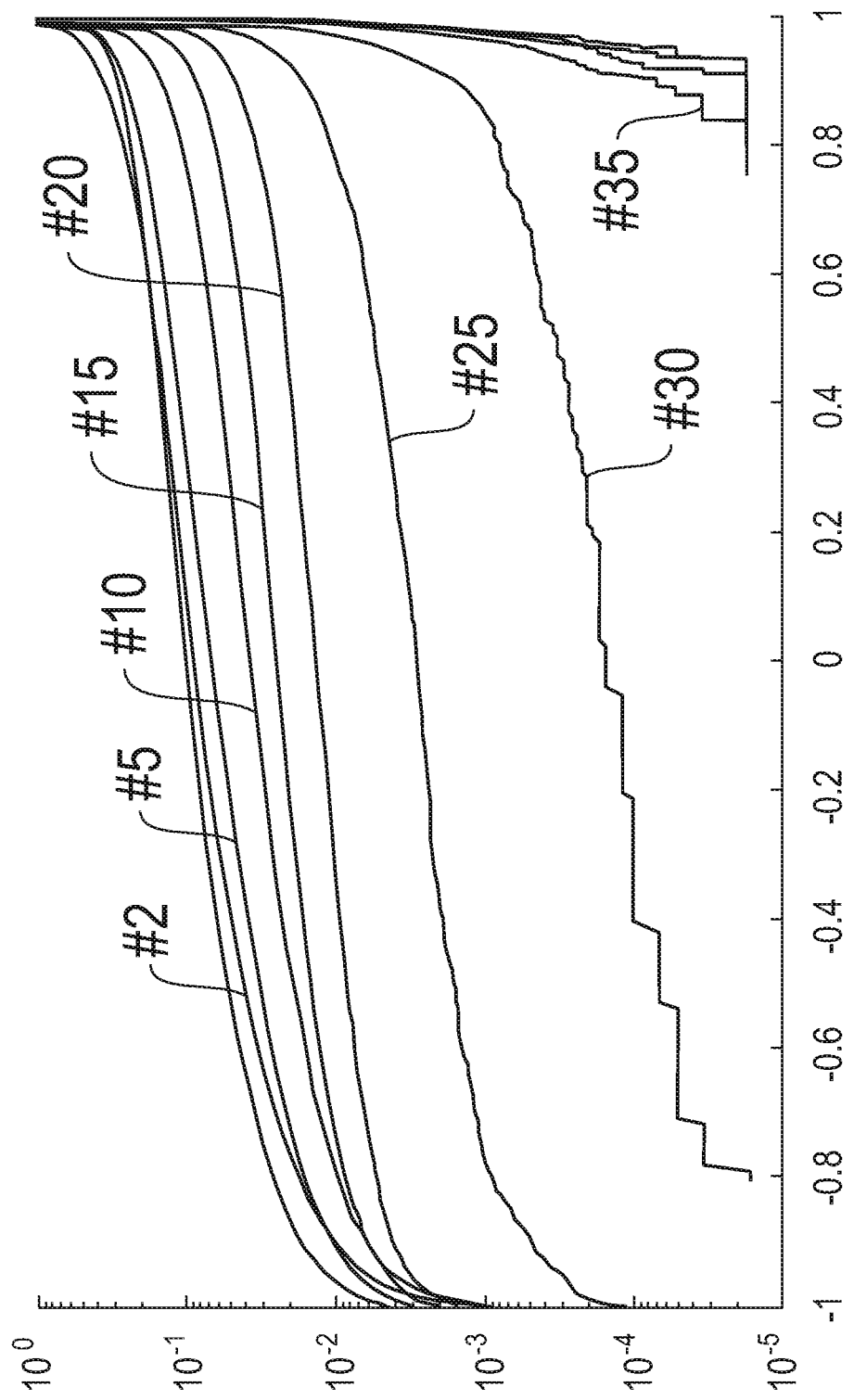
FIG. 6 is a logarithmic plot showing the increase in confidence value over multiple training epochs in an exemplary embodiment of the present disclosure.

FIG. 6 is a logarithmic plot showing the increase in confidence value over multiple training epochs in an exemplary embodiment of the present disclosure. The x-axis corresponds to the confidence value [0.0, 1.0]. The y-axis corresponds to the number of occurrences within the MNIST dataset. Each epoch is plotted separately, with epochs, 2, 5, 10, 15, 20, 25, 30, and 35 labeled for ease of reference.

Figure 7:
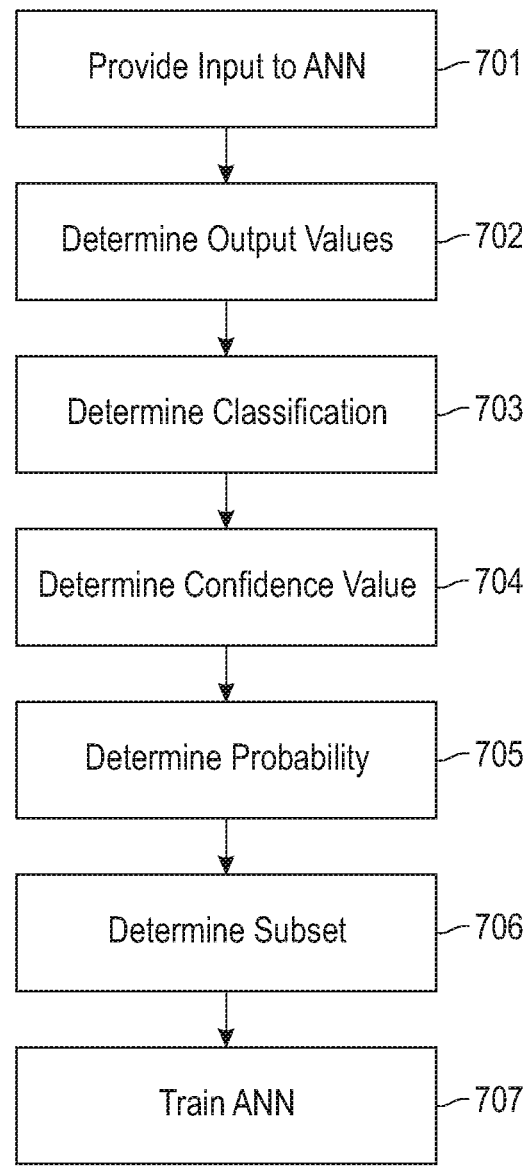
FIG. 7 illustrates a method of training an artificial neutral network according to embodiments of the present disclosure.

Referring to FIG. 7, a method of training a neural network is illustrated according to embodiments of the present disclosure. At 701, a training input from a set of training data is provided to an artificial neural network. The artificial neural network comprises a plurality of output neurons. Each output neuron corresponds to a class. From the artificial neural network, output values are determined at 702 at each of the plurality of output neurons. From the output values, a classification of the training input by the artificial neural network is determined at 703. A confidence value of the classification is determined at 704. Based on the confidence value, a probability is determined at 705. A subset of the set of training data is determined based on the probability at 706. The artificial neural network is trained at 707 based on the subset.

Figure 8:
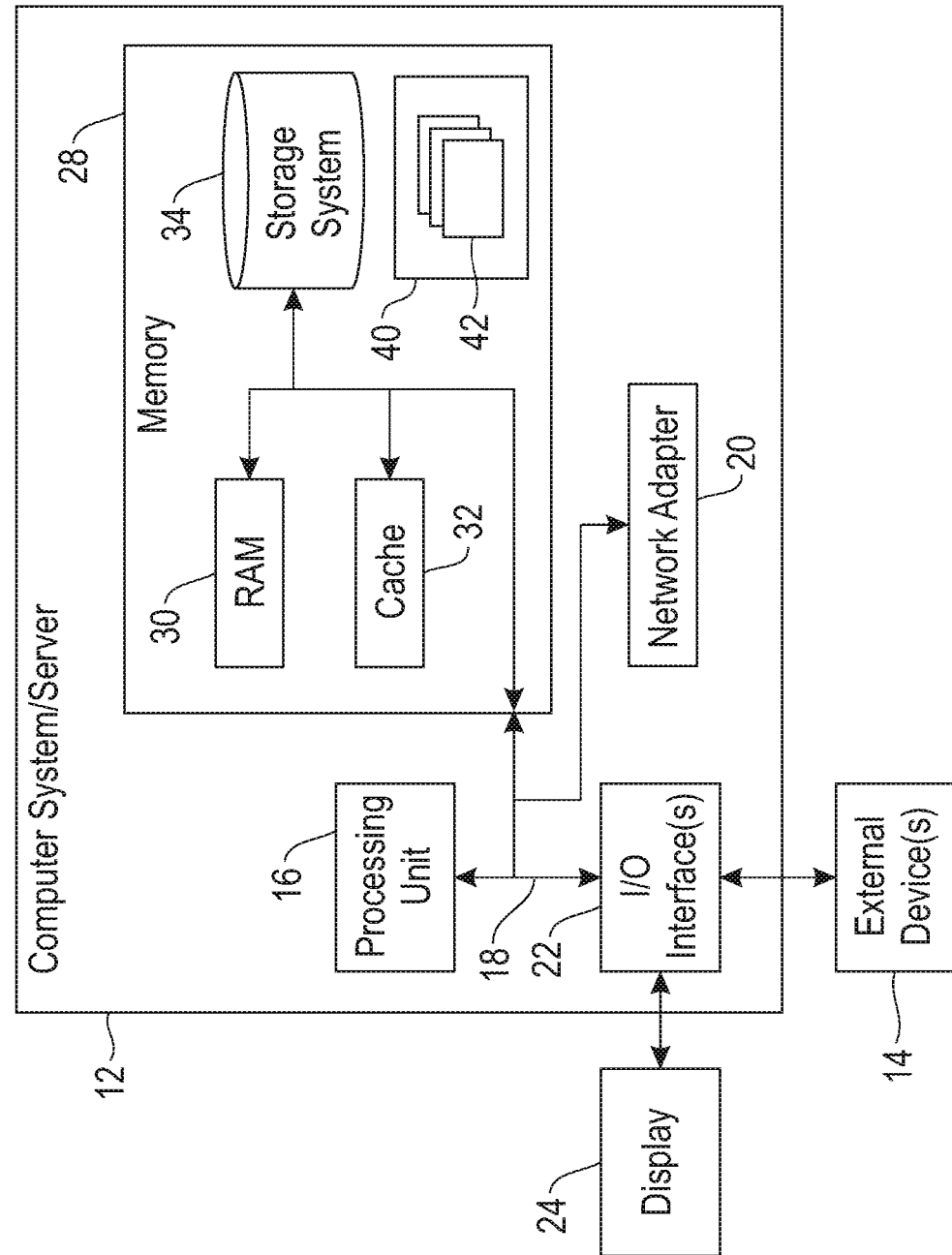
FIG. 8 depicts a computing node according to an embodiment of the present invention.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
providing training input from a set of training data to an artificial neural network, the artificial neural network comprising a plurality of output neurons, each output neuron corresponding to a class;
determining, from the artificial neural network, output values at each of the plurality of the output neurons;
determining, from the output values, a classification of the training input by the artificial neural network;
determining a confidence value of the classification by comparing the output values to an output value that corresponds to a predetermined class of the training input;
based on the confidence value, determining a probability of inclusion of the training input in subsequent training;
generating a subset of the set of training data based on the probability; and
training the artificial neural network based on the subset.

2. The method of claim 1, wherein the training input comprises an image.

3. The method of claim 1, wherein said determining the classification comprises determining the highest of the output values.

4. The method of claim 1, wherein the confidence value is positive when the classification corresponds to the predetermined class of the training input.

5. The method of claim 1, wherein the confidence value corresponds to a difference between (i) the output value that corresponds to the predetermined class of the training input and (ii) the highest of the other output values.

6. The method of claim 1, wherein the probability is 1 when the confidence value is within a predetermined range.

7. The method of claim 1, wherein the probability is monotonically decreasing with increasing positive confidence value.

8. The method of claim 1, wherein the probability is monotonically deceasing with decreasing negative confidence value.

9. The method of claim 1, wherein the training comprises backpropagation to adjust weights of the neural network based on errors in outputs.

10. A computer program product for training an artificial neural network, the computer program product comprising a computer readable storage medium having program instructions embodied therewith, the program instructions executable by a processor to cause the processor to perform a method comprising:
providing training input from a set of training data to an artificial neural network, the artificial neural network comprising a plurality of output neurons, each output neuron corresponding to a class;

determining, from the artificial neural network, output values at each of the plurality of output neurons;

determining, from the output values a classification of the training input by the artificial neural network;

determining a confidence value of the classification by comparing the output values to an output value that corresponds to a predetermined class of the training input;

based on the confidence value, determining a probability of inclusion of the training input in subsequent training;

generating a subset of the set of training data based on the probability; and training the artificial neural network based on the subset.

11. The computer program product of claim 10, wherein the training input comprises an image.

12. The computer program product of claim 10, wherein said determining the classification comprises determining the highest of the output values.

13. The computer program product of claim 10, wherein the confidence value is positive when the classification corresponds to the predetermined class of the training input.

14. The computer program product of claim 10, wherein the confidence value corresponds to a difference between (i) the output value that corresponds to the predetermined class of the training input and (ii) the highest of the other output values.

15. The computer program product of claim 10, wherein the probability is 1 when the confidence value is within a predetermined range.

16. The computer program product of claim 10, wherein the probability is monotonically decreasing with increasing positive confidence value.

17. The computer program product of claim 10, wherein the probability is monotonically decreasing with decreasing negative confidence value.

18. The computer program product of claim 10, wherein the training comprises backpropagation to adjust weights of the neural network based on errors in outputs.

19. A method of enhancing the performance of an artificial neural network by identification of a subset of training images to focus on, wherein the artificial neural network comprises a plurality of neurons, and is adapted to process a plurality of inputs to provide one or more output, the plurality of neurons is arranged in layers, outputs of one of the layers being connected to inputs of each neuron of a subsequent one of the layers by synapses, each of the synapses having a variable strength, the method comprising:

serially inputting a plurality of training examples to the artificial neural network, a desired output neuron being predetermined for each of the plurality of training examples;

determining the output of the artificial neural network;

computing, for each of the training examples a confidence value, the confidence value indicating the performance of the desired output neuron relative to the other output neurons;

computing a probability from each of the confidence values, indicating the probability of inclusion in subsequent training;

selecting a subset of the training examples for subsequent training based on the probabilities;

updating the synaptic strengths by backpropagation based on (i) the difference between the output of the network and (ii) desired output for the subset of the training examples; and recomputing confidence values, reselecting a subset of the training examples, and re-updating the synaptic strengths until the network achieves a desired target accuracy.

* * * * *